United States Patent
Kitajima

(10) Patent No.: US 8,405,626 B2
(45) Date of Patent: Mar. 26, 2013

(54) IMAGE PROJECTION APPARATUS AND CONTROL METHOD FOR SAME

(75) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 482 days.

(21) Appl. No.: 12/674,629

(22) PCT Filed: Aug. 28, 2008

(86) PCT No.: PCT/JP2008/066010
§ 371 (c)(1),
(2), (4) Date: Feb. 22, 2010

(87) PCT Pub. No.: WO2009/031633
PCT Pub. Date: Mar. 12, 2009

(65) Prior Publication Data
US 2011/0169746 A1     Jul. 14, 2011

(30) Foreign Application Priority Data
Sep. 4, 2007   (JP) .................................. 2007-229455

(51) Int. Cl.
*G06F 3/041* (2006.01)
(52) U.S. Cl. ........ 345/173; 345/156; 345/169; 715/863; 715/810; 434/429; 382/313
(58) Field of Classification Search .................. 345/156, 345/169, 173, 179; 715/863; 455/429; 434/76, 434/92, 180, 310, 324
See application file for complete search history.

(56) References Cited

U.S. PATENT DOCUMENTS

| 6,597,384 | B1 * | 7/2003 | Harrison | 345/204 |
| 2008/0163131 | A1 * | 7/2008 | Hirai et al. | 715/863 |
| 2008/0165132 | A1 * | 7/2008 | Weiss et al. | 345/173 |

FOREIGN PATENT DOCUMENTS

| JP | 10-021041 A | 1/1998 |
| JP | 2002-358162 A | 12/2002 |
| JP | 2005-236746 A | 9/2005 |
| JP | 2006-522397 A | 9/2006 |
| JP | 2007-101825 A | 4/2007 |
| WO | 2006/104132 A | 10/2006 |

OTHER PUBLICATIONS

The above references cited in a Oct. 3, 2011 Japanese Office Action, which is enclosed without an English Translation, that issued in Japanese Patent Application No. 2007-229455.

* cited by examiner

*Primary Examiner* — Lun-Yi Lao
*Assistant Examiner* — Md Saiful A Siddiqui
(74) *Attorney, Agent, or Firm* — Cowan, Liebowitz & Latman, P.C.

(57) ABSTRACT

In an image projection apparatus capable of detecting user operations on a projected image, detecting a moving direction to/from the projected image of an object (for example, a hand) that a user uses to operate a GUI from, for example, an image taken of a region of a projection surface that includes the projected image. Then, depending on the detected direction, the display position or the display direction of the GUI is decided and images projected, thus improving usability.

8 Claims, 18 Drawing Sheets

F I G. 13A
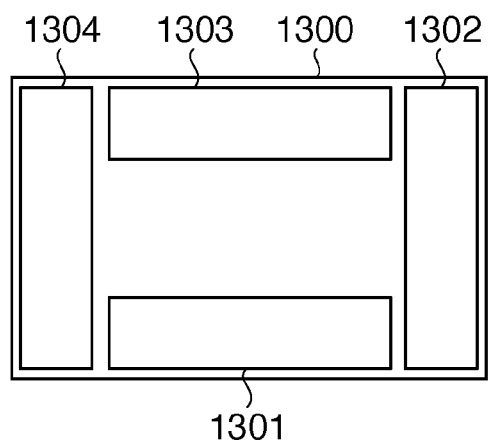
F I G. 13B
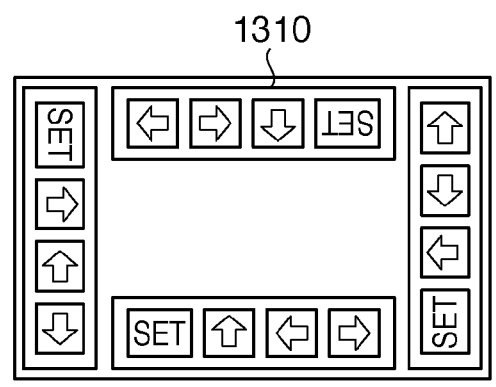

FIG. 14A
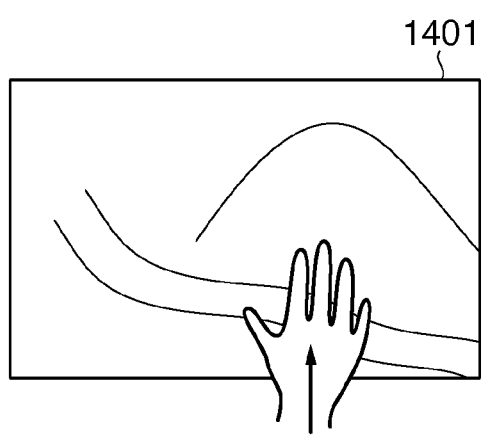
FIG. 14C
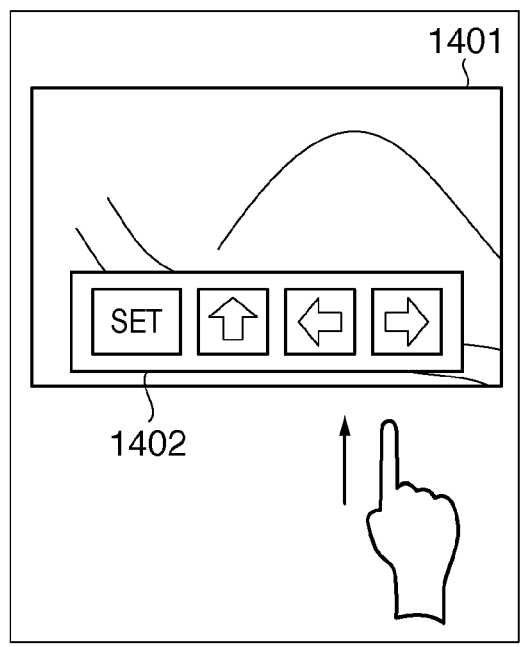
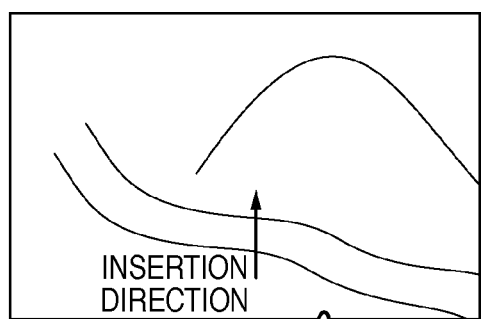
FIG. 14B

F I G. 16
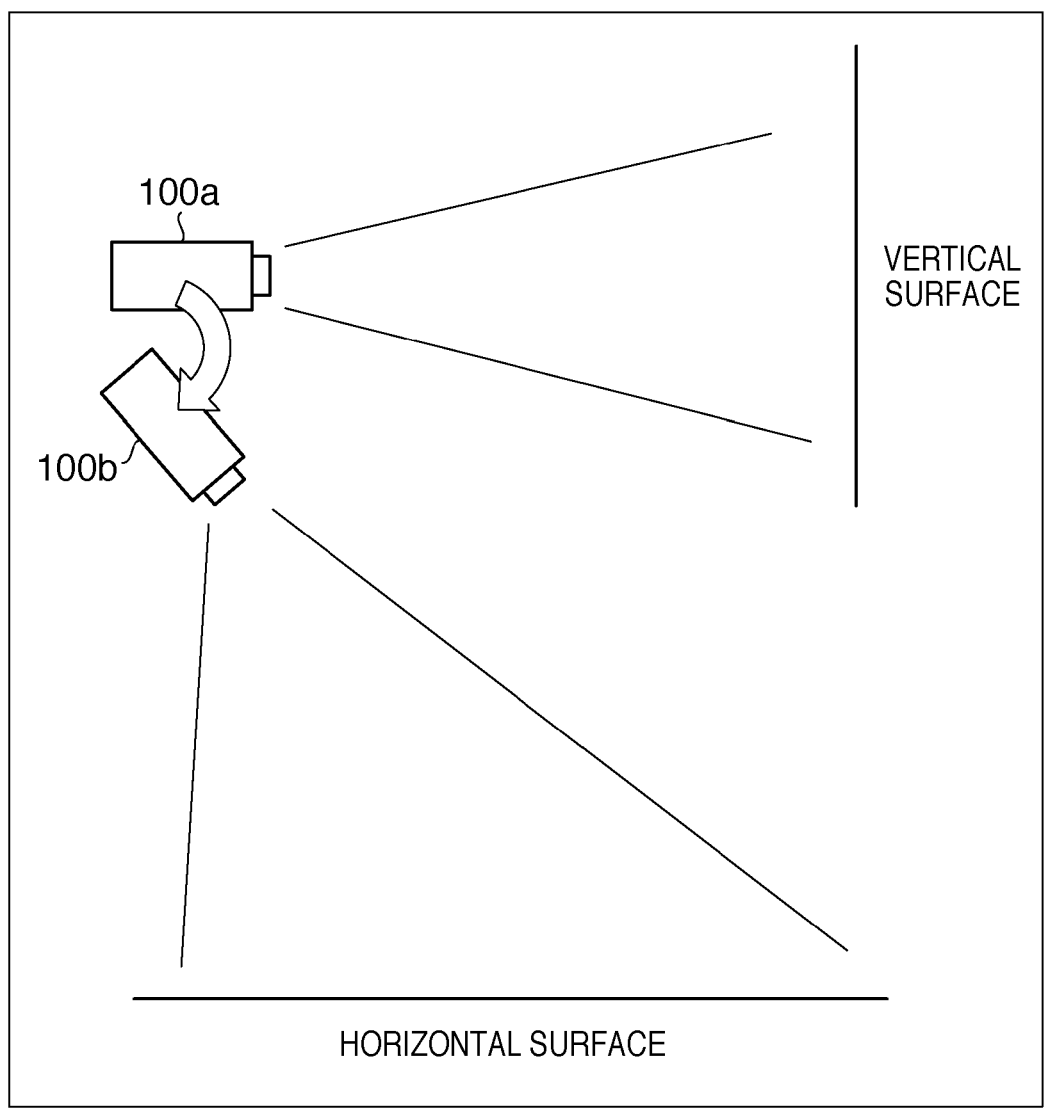

IMAGE PROJECTION APPARATUS AND CONTROL METHOD FOR SAME

CROSS-REFERENCE TO RELATED APPLICATIONS

This application is a national stage application of International Application No. PCT/JP2008/066010, filed Aug. 28, 2008, whose benefit is claimed and which claims the benefit of Japanese Patent Application No. 2007-229455, filed Sep. 4, 2007, the entire disclosures of which are incorporated herein by reference.

TECHNICAL FIELD

The present invention relates to an image projection apparatus that projects an image and a control method for the same, and more particularly, to an image projection apparatus capable of utilizing a projected image as a user interface for operating the image projection apparatus, and a control method for the same.

BACKGROUND ART

Conventionally, an image projection apparatus as typified by a projector is designed to project video images output by a computer, media player, or the like for viewing purposes, and is used not only in conference rooms and stores, of course, but also in homes.

The conventional projector, because it is designed to project onto a large screen, is relatively large itself, and is usually affixed to the ceiling or placed on a desk or the floor when in use.

Operation of this type of projector is typically carried out using a variety of buttons provided on the body of the projector or with a remote-control device provided as an accessory to the projector.

By contrast, in order to view images in small groups of four or five people, equipping a mobile phone with a built-in, small-scale image projection apparatus has been proposed (see Japanese Patent Application Publication No. 2005-236746).

When projecting video images using an image projection apparatus built into a mobile phone, it is contemplated that the mobile phone is taken and held in the hand. Then, it is assumed that a need arises to operate the image projection apparatus during projection, for example, to switch images, or to change the settings of the image projection apparatus.

In this case, it is likely that operation is carried out using the phone buttons and keys with which mobile phones are ordinarily provided. However, operating buttons and keys while holding the mobile phone and projecting images causes the projection place to fluctuate and the size of the projected images to fluctuate, and is not easy to use.

Moreover, providing the mobile phone with a separate remote-control device for operating the image projection apparatus is not practical.

Thus, conventionally, there has been no proposal to facilitate user operations taking into account a case in which the image projection apparatus has been made so compact that it is held in the hand when used.

DISCLOSURE OF INVENTION

The present invention is conceived in light of the problem described above, and provides an image projection apparatus that can be easily operated even while projecting an image, and a control method for the same.

According to an aspect of the present invention, there is provided an image projection apparatus comprising: a projection unit adapted to project a projection image and a GUI image onto a projection surface; a position detection unit adapted to detect a position of a predetermined object on the projection surface; a moving direction determination unit adapted to determine a moving direction of the predetermined object based on detection results obtained by the position detection unit; a deciding unit adapted to decide at least one of a display position and a display direction of the GUI image based on detection results obtained by the position detection unit and determination results obtained by the moving direction determination unit; a control unit adapted to control a projection operation of the GUI image performed by the projection unit based on at least one of the display position and the display direction decided by the deciding unit; and an operation detection unit adapted to detect an operation based on detection results obtained by the position detection unit of the projection surface on which the GUI image is projected.

According to another aspect of the present invention, there is provided a control method for an image projection apparatus, comprising: a projection step of projecting a projection image onto a projection surface with a projection unit; a position detection step of detecting information relating to a position of a predetermined object on the projection surface; a moving direction determination step of determining a moving direction of the predetermined object from information relating to the position of the predetermined object detected in the position detection step; a deciding step of deciding at least one of a display position and a display direction of a GUI image projected using the projection unit based on detection results obtained in the position detection step and determination results obtained in the moving direction determination step; a control step of controlling the projection unit based on at least one of the display position and the display direction decided in the deciding step and at the same time projecting the GUI image onto the image; and an operation detection step of detecting an operation in the projection surface onto which the GUI image is projected based on information relating to the position of the predetermined object detected in the position detection step.

Further features of the present invention will become apparent from the following description of exemplary embodiments with reference to the attached drawings.

BRIEF DESCRIPTION OF DRAWINGS

FIGS. 13A and 13B are diagrams illustrating an example of a menu candidate display position in an image projection apparatus according to a second embodiment of the present invention;

FIGS. 14A-14C are diagrams illustrating an example of a menu display result in the image projection apparatus according to the second embodiment of the present invention;

FIG. 16 is a diagram showing schematically projection directions capable of being handled by a projection unit of the image projection apparatus according to the third embodiment of the present invention;

BEST MODE FOR CARRYING OUT THE INVENTION

Preferred embodiments of the present invention will now be described in detail in accordance with the accompanying drawings.

(First Embodiment)

Figure 1:
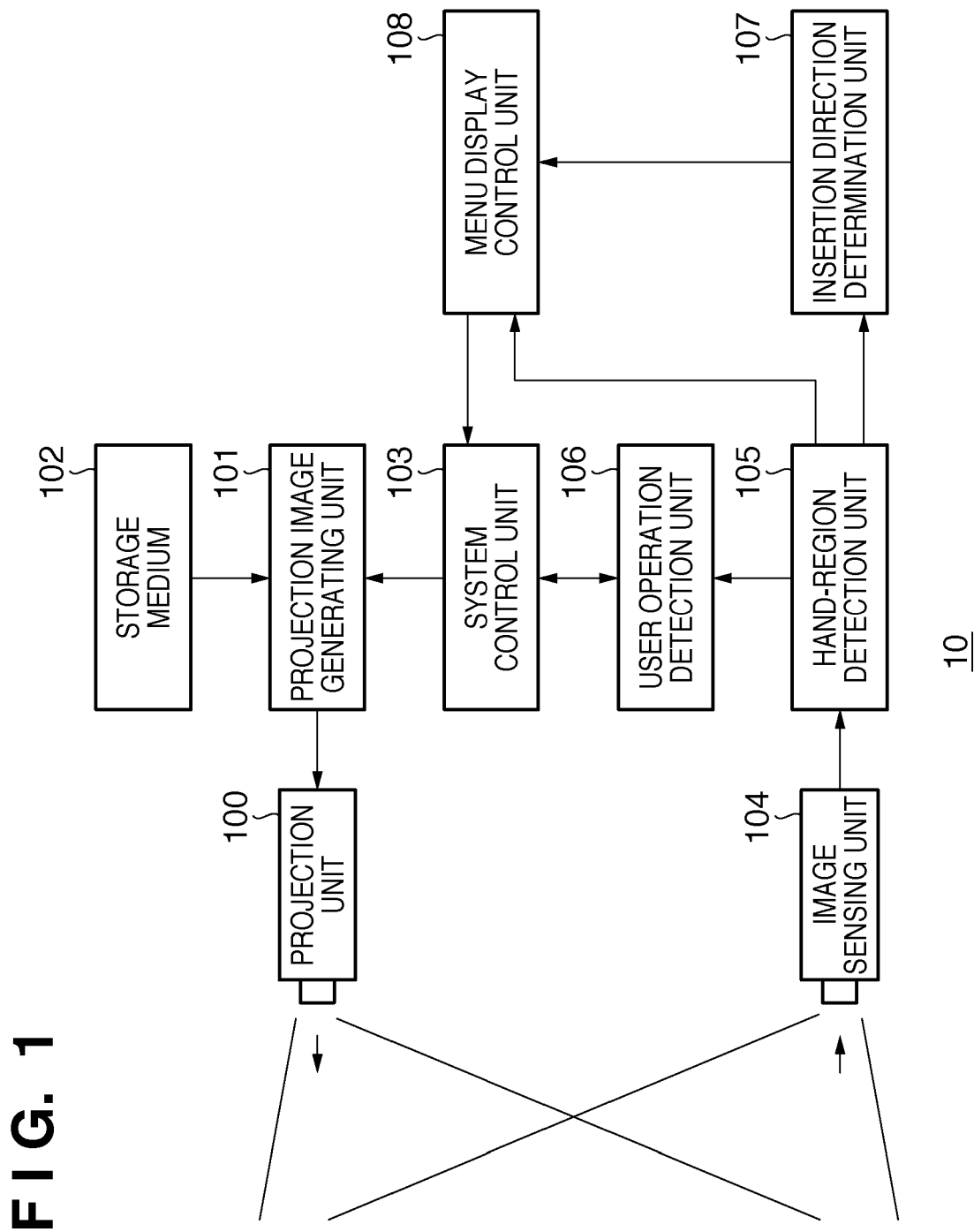
FIG. 1 is a block diagram showing one configuration example of an image projection apparatus according to a first embodiment of the present invention.

FIG. 1 is a block diagram showing one configuration example of an image projection apparatus 10 according to a first embodiment of the present invention.

In the image projection apparatus 10, a projection unit 100 includes a light source, lens, display device, and the like, and projects an image supplied from a projection image generating unit 101. The projection image generating unit 101 generates a projection image from image data stored on a storage medium 102 such as a memory card and supplies the projection image to the projection unit 100. A system control unit 103 is a microprocessor including, for example, a CPU, a ROM, and a RAM. By the CPU reading into the RAM a program stored in the ROM and executing it, the system control unit 103 controls operation of the image projection apparatus 10.

An image sensing unit 104 is, for example, a camera capable of projecting a moving image, and includes an image sensing element, such as a CCD image sensor or a CMOS image sensor, and a lens for forming an optical object image on the image sensing element. It should be noted that, in the present embodiment, the image sensing unit 104 is an infrared camera capable of image sensing only an infrared region. In addition, in the present embodiment an image sensing range of the image sensing unit 104 is a range that includes a projection range of the projection unit 100. The image sensing unit 104 supplies sensed images to a hand-region detection unit 105.

From the sensed image supplied from the image sensing unit 104, the hand-region detection unit 105 detects, as one example of a predetermined, particular object, a human hand, specifically, an image region (a hand region) identified as a human hand. Information relating to the detected hand region is given to a user operation detection unit 106 and an insertion direction determination unit 107.

The user operation detection unit 106 detects the user operation based on the information relating to the hand region. The insertion direction determination unit 107 determines a moving direction of the hand that is the predetermined object as the insertion direction and outputs determination results to a menu display control unit 108. The menu display control unit 108 controls menu display based on the insertion direction of the hand on the projected image.

Figure 2:
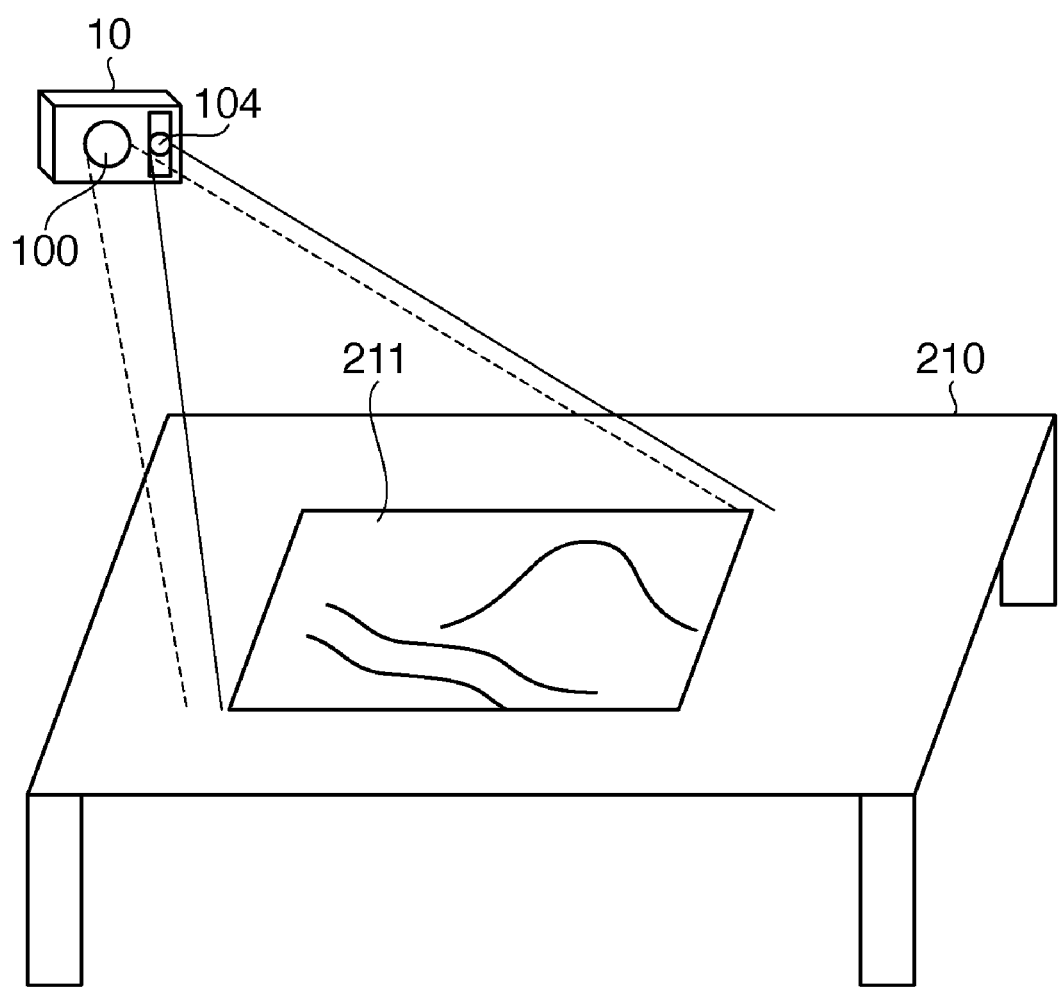
FIG. 2 is a diagram showing schematically an example of an appearance and a state of use of the image projection apparatus according to the first embodiment of the present invention.

FIG. 2 is a diagram showing schematically an example of an appearance and a state of use of the image projection apparatus 10 shown in FIG. 1. In the example shown in FIG. 2, the state is shown in which the projection surface is a horizontal surface formed by a desk or a table, and a projected image 211 is projected onto the projection surface 210.

(Image Projection Operation)

Referring once again to FIG. 1, a description is given of an image projection operation of the image projection apparatus of the present embodiment.

On the storage medium 102 are recorded multiple pieces of image data. The system control unit 103 specifies one of the multiple pieces of image data recorded on the storage medium 102 and outputs the readout request to the projection image generating unit 101. The projection image generating unit 101 reads out the specified image data from the storage medium 102, and carries out processes, for example, decoding the image data if the image dated is encoded, so as to generate image data (image for display) in order to display on the projection unit 100. The image for display is supplied to the projection unit 100, and the projection unit 100 projects the image based on the image for display.

It should be noted that, for example, the user may specify the image to be projected from among the multiple pieces of image data stored on the storage medium 102. This specification can be carried out using any known method, such as using a file browser that the Operation System software provides.

(User Operation Detection Operation)

Next, a description is given of detecting a user operation in the image projection apparatus 10 of the present embodiment.

As described above, the image sensing unit 104 is an infrared camera capable of sensing only the infrared region, and senses a region on the projection range, in other words on the projection surface including the projected image. The image sensing unit 104 outputs image data obtained by image sensing to the hand-region detection unit 105 in, for example, units of frames.

Figure 3A:
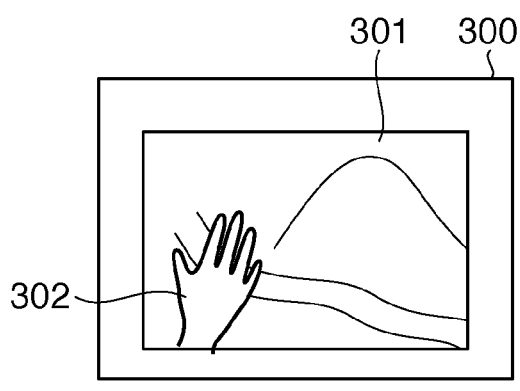
FIGS. 3A and 3B are diagrams illustrating operation of a hand-region extraction unit of the image projection apparatus according to the first embodiment of the present invention.

From the image data supplied from the image sensing unit 104, the hand-region detection unit 105 detects a region corresponding to a predetermined object, in this case, as one example, a region corresponding to the user's hand (hand region). FIG. 3A shows an example of a state in which a user's hand 302 intrudes into (is inserted into) a projected image 301 on a projection surface 300.

Figure 3B:
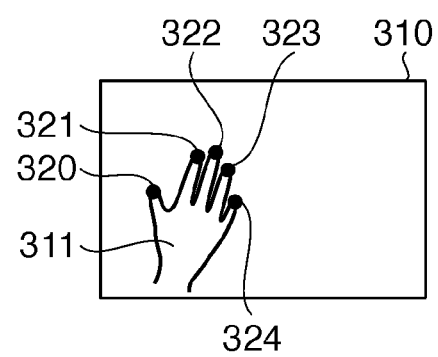

The hand region detection unit 105 can extract the user's hand region from an infrared image using a method similar to a method described in, for example, Japanese Patent Application Publication No. 2005-236746. Specifically, because the image sensing unit 104 is an infrared camera, it measures radiant light from the user's hand region and extracts only those objects with temperatures in a predetermined range (approximately 30° C.-34° C., which is approximately the temperature of the human body). As a result, in the sensed image only the user's hand region appears. The hand-region detection unit 105, after processing the sensed image data supplied from the image sensing unit 104 to remove noise, detects the hand region and fingertip positions using pattern matching. FIG. 3B shows a hand region 311 and fingertip positions 320-324 detected from an image 310 sensed by the image sensing unit 104 in the state shown in FIG. 3A.

The hand-region detection unit 105, as information relating to the detected hand region, for example, outputs information indicating a range of the hand region and information indicating the fingertip positions to the user operation detection unit 106, the insertion direction determination unit 107, and the menu and display control unit of 108.

(Insertion Direction Determination Operation)

Figure 4:
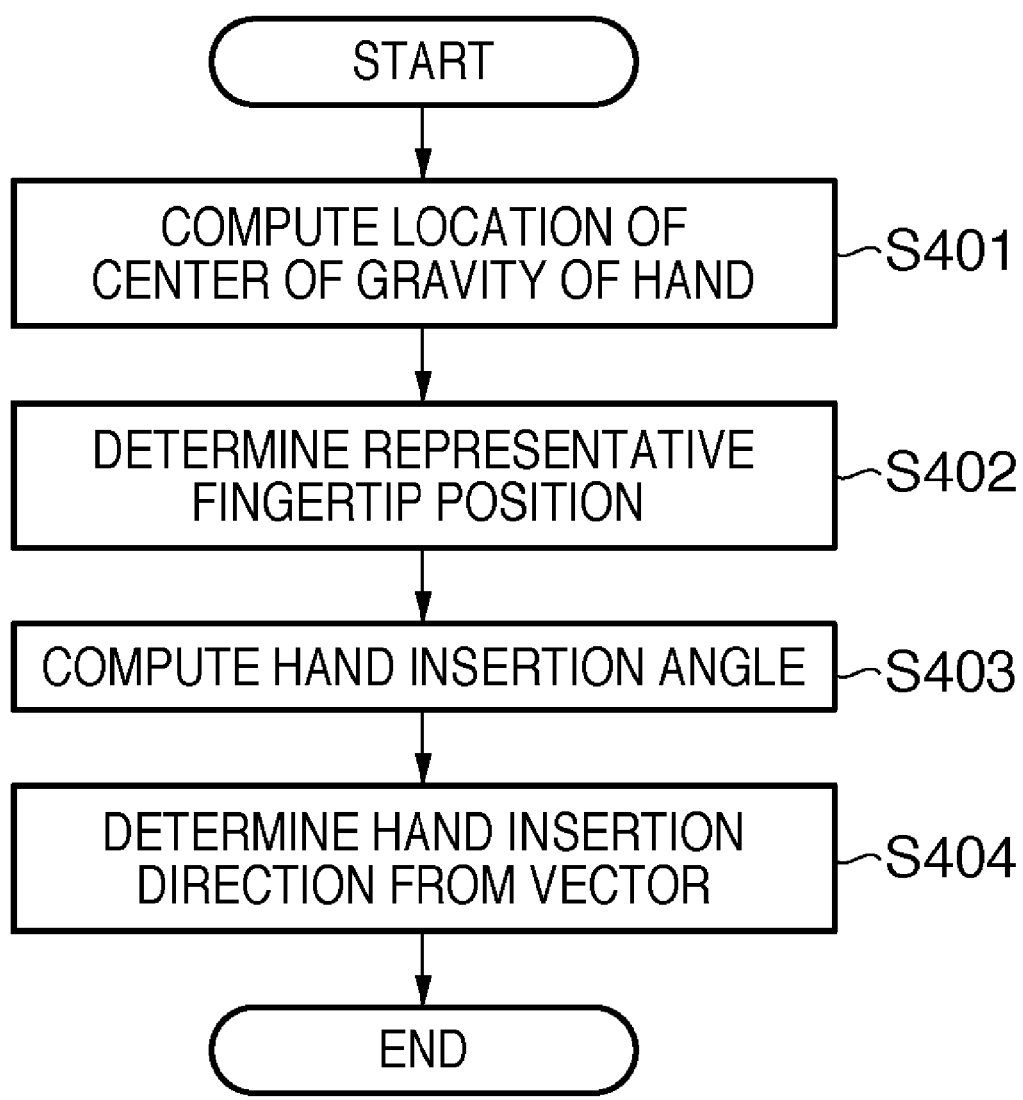
FIG. 4 is a flow chart illustrating operation of an insertion direction determination unit of the image projection apparatus according to the first embodiment of the present invention.
Figure 5A:
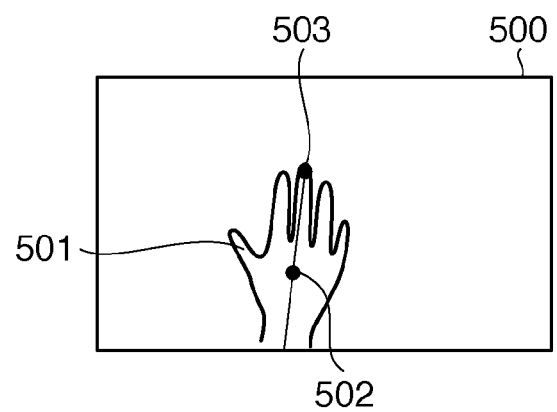
FIGS. 5A-5C are diagrams showing an insertion direction determination example in the image projection apparatus according to the first embodiment of the present invention.
Figure 5B:
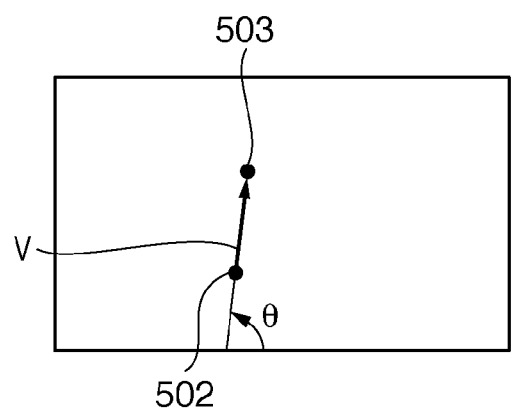
Figure 5C:
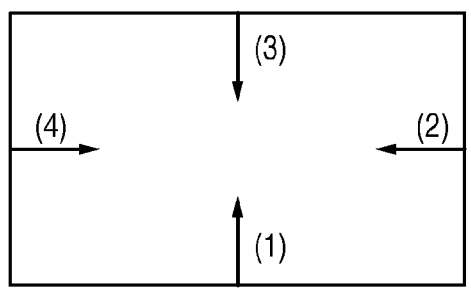

The insertion direction determination unit 107 is a moving direction determination means that determines the moving direction of a predetermined object. Specifically, the insertion direction determination unit 107 determines from which direction the user's hand is inserted into the projected image. Below a description is given of the operation of the insertion direction determination unit 107, using FIG. 4 and FIGS. 5A-5C. FIG. 4 is a flow chart illustrating the insertion direction determination operation. FIGS. 5A-5C are diagrams illustrating a predetermined object moving direction (hereinafter referred to as insertion direction) determination example in the present embodiment.

In S401, the insertion direction determination unit 107, based on information relating to the hand region input from the hand region detection unit 105 computes the center of gravity of the hand region. The center of gravity can for example be computed as the average coordinates of the pixels contained in the hand region detected by the hand region detection unit 105. Alternatively, other methods may be used, such as obtaining the center of gravity of an external quadrilateral enclosing the hand region.

In S402, the insertion direction determination unit 107 detects the representative fingertip position. As described above, although in the hand region detection unit 105 detection of the fingertip positions is completed, from among a plurality of fingertip positions a representative fingertip position to be used as a position that operates a GUI image is determined. Here, that fingertip position which is at the greatest distance from the center of gravity is made the representative fingertip position.

FIG. 5A is a diagram showing an example of a representative fingertip position 503 and a center of gravity 502 computed for a hand region 501.

In S403, the insertion direction determination unit 107 computes a hand insertion angle. Specifically, as shown in FIG. 5B, the insertion direction determination unit 107 computes an angle $\theta$ of a vector v extending from the center of gravity 502 of the hand to the representative fingertip position 503 with respect to a bottom side of the projected image as the insertion angle. The vector v is referred to as the insertion direction vector.

In S404, the insertion direction determination unit 107, depending on the angle of the insertion direction vector, determines an insertion direction that is found to be the closest among predetermined insertion directions. For example, assume that the predetermined insertion direction is either a top direction (1), a left direction (2), a bottom direction (3), or a right direction (4) as shown in FIG. 5C. In this case, the angle of the vector with respect to each direction is 90°, 180°, 270°, 0°.

In a case in which the insertion direction vector v has an angle $\theta$ shown in FIG. 5B, the top direction (1) is determined to be the closest insertion direction. It should be noted that in a case in which the angle of the insertion direction vector v is an angle of intermediate value with respect to the predetermined directions, such as 45°, 135°, 225°, 315°, the determination method may be determined as convenient.

Thus, as described above, the insertion direction determination unit 107 determines the insertion direction of the hand and outputs determination results to the menu display control unit 108.

It should be noted that the hand region detection and insertion direction determination processes described above may be executed for all the images sensed by the image sensing unit 104, and may be executed at each predetermined time period. For example, in a case in which the image sensing unit 104 senses 15 frames of images every second, of those 15 frames, hand reaching detection and insertion and direction determination can be carried out for one frame. The frequency of processing may be determined as convenient, balancing system load and required detection accuracy.

(Menu Display Control)

Figure 6:
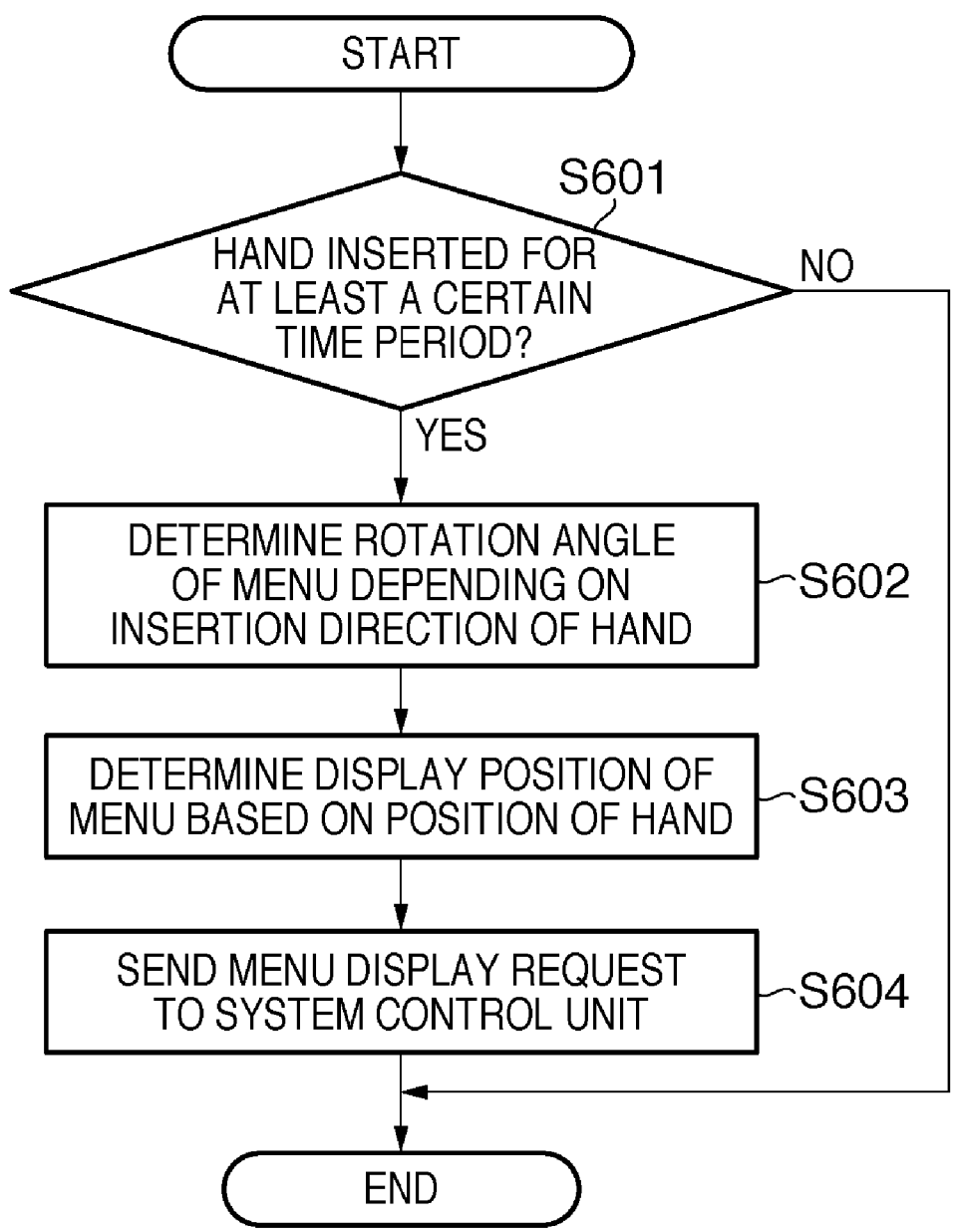
FIG. 6 is a flow chart illustrating operation of a menu display control unit of the image projection apparatus according to the first embodiment of the present invention.

FIG. 6 is a flow chart showing one example of operation of the menu display control unit 108.

It should be noted that, here, "menu" means an operation menu that is a GUI image superimposed on the projected image to enable the user to give instructions to the image projection apparatus 10 by operating the projected image. The menu display control unit 108 determines at least one of a display position and a display direction of the menu, based on detection results from the hand region detection unit 105 and on determination results from the insertion direction determination unit 107.

In S601, the menu display control unit 108 determines whether or not a hand (or a predetermined object) as an object for the purpose of operating the GUI image exists on (is inserted in) the projected image for at least a certain time period. Specifically, the menu display control unit 108 can make this determination based on whether or not the insertion direction is supplied continuously for at least a certain time period from the insertion direction determination unit 107. Alternatively, the same determination can also be carried out based on whether or not the hand region is detected continuously for at least a certain time period from information relating to the hand region from the hand region detection unit 105.

In S601, if it is determined that a hand exists on the projected image for least a certain time period, the menu display control unit 108 advances processing to S602. On the other hand, if insertion of the hand is not detected or is found to be not detected continuously for at least a certain time period, then the menu display control unit 108 determines that the hand is not inserted, and terminates processing.

In S602, the menu display control unit 108 determines the rotation angle (display angle) of the menu depending on the insertion direction provided from the insertion direction determination unit 107.

FIGS. 7A-7D are diagrams showing examples of a relation between a determined insertion direction and a menu rotation angle in the present embodiment.

Figure 7A:
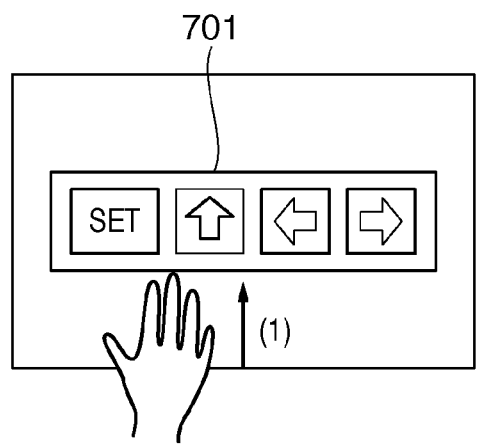
FIGS. 7A-7D are diagrams showing examples of a relation between a determined insertion direction and a menu rotation angle in the image projection apparatus according to the first embodiment of the present invention.
Figure 7B:
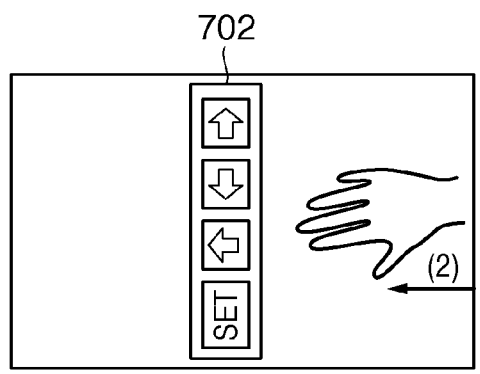
Figure 7C:
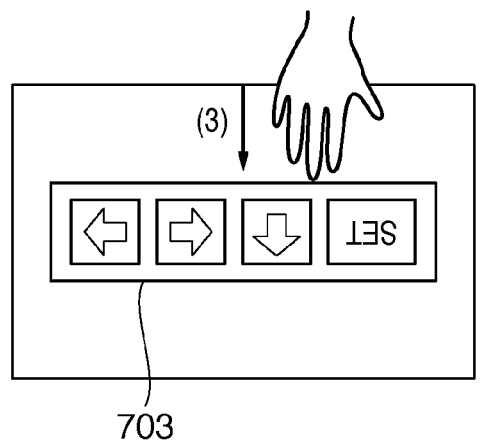
Figure 7D:
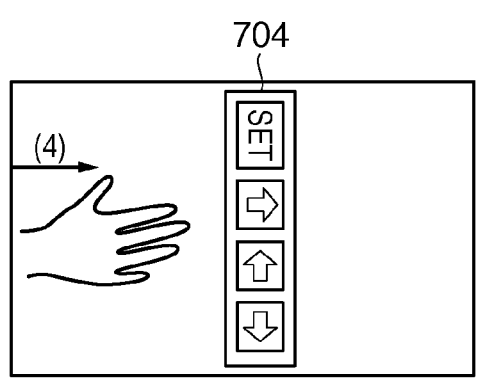

FIGS. 7A-7D show examples of menu rotation angles for the predetermined insertion directions (1)-(4) shown in FIG. 5C. Menus 701-704 are rotated and displayed at angles that depend on the insertion direction of the hand. For example, in a case in which it is determined that the insertion direction is from the right side of the projected image (moving left) like (2) in FIG. 5C, the menu display control unit 108 rotates the menu 90° so that the left edge of the projected image is at the top as shown in FIG. 7B. In other words, the menu display control unit 108 determines the rotation angle of the menu so that the insertion direction of the hand and the top of the menu always match.

Next, in S603, the menu display control unit 108 determines the display position of the menu depending on the position of the hand.

FIGS. 8A-8D are diagrams showing examples of a relation between the position of the hand and the display position of the menu.

Figure 8A:
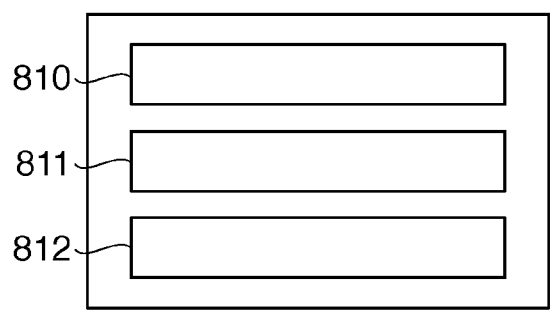
FIGS. 8A-8D are diagrams showing examples of a relation between a hand position and a menu display position in the image projection apparatus according to the first embodiment of the present invention.
Figure 8B:
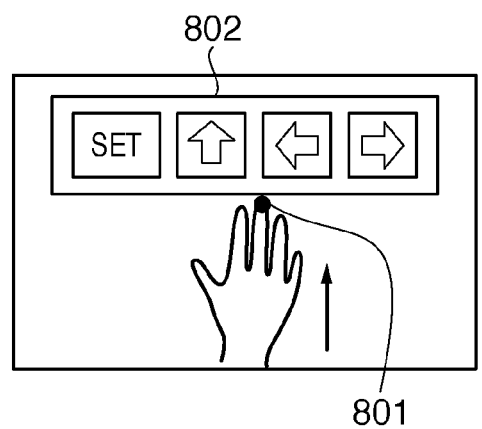
Figure 8C:
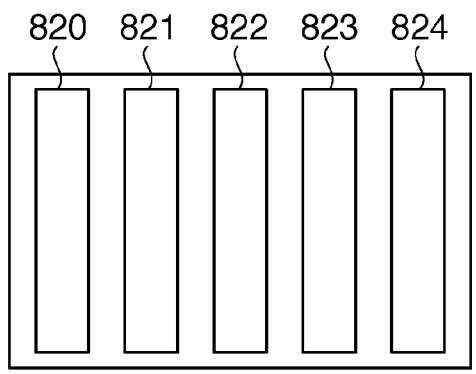
Figure 8D:
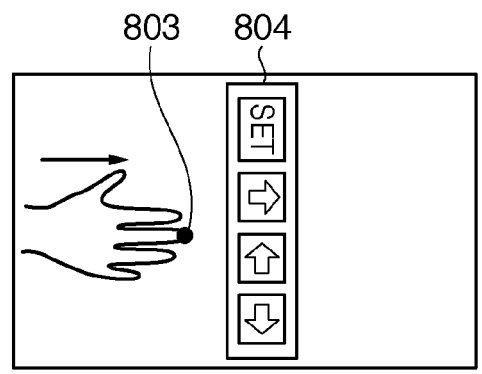

FIGS. 8A and 8C are diagrams showing examples of the positions at which the menu can be superimposed in the image projection apparatus 10 of the present embodiment, and FIGS. 8B and 8D are diagrams showing positions of the hand and the menu display positions determined depending on the position of the hand.

The image projection apparatus 10 of the present embodiment, from among predetermined display position choices like those shown in FIGS. 8A and 8C, decides as the menu display position a position nearest in the vicinity of the representative fingertip position as well as separated in the insertion direction of the hand.

For example, FIG. 8A shows candidate display positions 810-812 when the hand insertion direction is the direction (1) shown in FIG. 5C. For example, as shown in FIG. 8B, the candidate display position 810 that is closest from the representative fingertip position 801 in the insertion direction of the hand (in this case upward) is determined as the display position of the menu 802.

Similarly, FIG. 8C shows candidate display positions 820-824 when the hand insertion direction is the direction (4) shown in FIG. 5C. For example, as shown in FIG. 8D, the candidate display position 822 closest to the representative fingertip position 803 in the insertion direction of the hand (in this case toward the right) is determined as the display position of the menu 804.

It should be noted that, in a case in which there is no candidate display position that fulfills the conditions described above, the candidate display position closest to the representative fingertip position or the candidate display position closest to the edge of the projected image on the side of the insertion direction of the hand is decided as the display position. That is, for example, in the case of FIG. 8A, the candidate display position 810 is determined as the display position, and in the case of FIG. 8C, the candidate display position 824 is determined as the display position.

In addition, more candidate display positions may be set, and a position in the vicinity of the representative fingertip position of the hand separated a predetermined distance in the insertion direction may be determined as the display position, without setting particular candidate display positions.

In S604, the menu display control unit 108 sends a request to the system control unit 103 to superimpose and display the menu on the projected image. Moreover, the menu display control unit 108 also sends the determined menu display position and rotation angle information to the system control unit 103.

The system control unit 103, once it receives a menu display request from the menu display control unit 108, sends the menu display position and rotation angle information to the projection image generating unit 101. The projection image generating unit 101 rotates a pre-registered menu image based on the rotation angle information. Then, the projection image generating unit 101 superimposes on the image from the storage medium 102 the menu image at the position corresponding to the menu display position and generates an image for display, which it then outputs to the projection unit 100. In this manner, an image on which the menu is superimposed is projected from the projection unit 100.

Figure 9A:
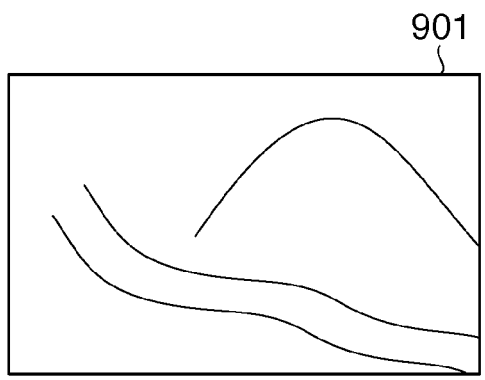
FIGS. 9A-9D are diagrams showing an example of a menu display result in the image projection apparatus according to the first embodiment of the present invention.
Figure 9B:
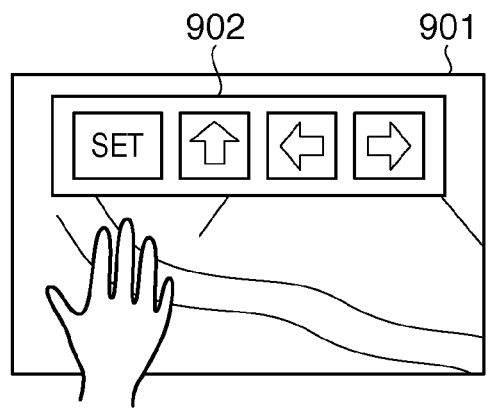

Examples of menu display results are shown in FIGS. 9A-9D. FIG. 9A shows a state in which the projected image is composed of only the image read out from the storage medium 102, without the insertion of the user's hand into the projected image 901. FIG. 9B shows a state in which the user's hand is inserted into the projected image 901 for a certain time period and a menu 902 is superimposed on the projected image 901 at a display position depending on the insertion direction of the hand and the position of the hand.

The user operation detection unit 106 detects user instruction operations based on information relating to the hand region provided from the hand region detection unit 105, and outputs detected instruction operation information to the system control unit 103. User instruction operations are, for example, pointing operations with the user's hand like that shown in FIG. 9C. The pointing operation can be detected on the basis of, for example, the fact that the number of pieces of fingertip position information is one, or the distinctive features of the shape of the hand region. The user operation detection unit 106, when it detects a user pointing operation, outputs fingertip position information to the system control unit 103.

Figure 9C:
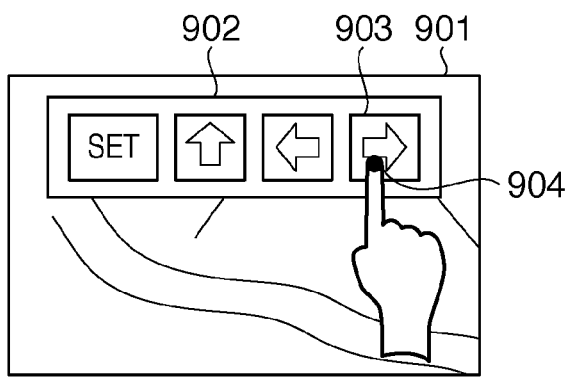
Figure 9D:
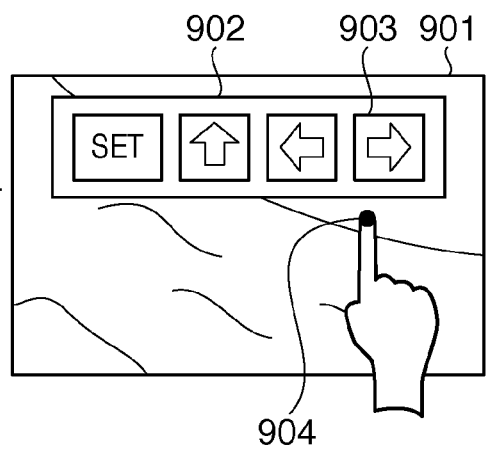

The system control unit 103, with respect to the menu item displayed, determines if the user instruction operation is continuing for at least a predetermined time period. In other words, the system control unit 103 checks if the fingertip position continues to exist over a predetermined time period within a region of the buttons included in the menu 902 as shown in FIG. 9C. In a case in which it is determined that the fingertip position continues to exist over at least a predetermined time period within a region of the buttons included in the menu 902, the system control unit 103 determines that the user is operating that menu item, and carries out operation according to the menu item.

The example shown in FIG. 9C shows a state in which a fingertip position 904 continues to exist over at least a predetermined time period in the region of a button 903 included in the menu 902. In this case, the system control unit 103 determines that button 903 is being operated, and carries operation according to button 903.

For example, if button 903 is a button that switches the projected image to the next image stored on the storage medium 102, then the system control unit 103 causes the projection image generating unit 101 to read out the next image and generate an image for display superimposed on the menu 902. As a result, the projected image is switched to that shown for example in FIG. 9D.

It should be noted that the user may be notified by voice or the like that a determination that a menu item has been operated has been made, thus relieving the user of the need to continue to indicate the menu item for an extended period of time, thereby improving usability.

In a case in which, after displaying the menu, an image of a hand in the sensed image is not detected after a predetermined time continues, display of the menu is stopped.

Thus, as described above, the image projection apparatus of the present embodiment comprises an insertion direction detection unit that detects an insertion direction of a hand of a user inserted into a projected image, and a menu display control unit that decides a position and a rotation angle of a menu display depending on the insertion direction of the hand.

Accordingly, even in a case in which the hand is inserted from a variety of different directions, the possibility increases that the menu will be displayed in a direction which can be properly seen by the user, and therefore legibility can be improved and malfunctions can be suppressed. In addition, because the position of the projected menu changes depending on the position of the inserted hand, degradation of legibility and malfunctions due to display of the menu on top of the position of the user's hand can be eliminated.

(Variation 1)

In the example described above, in order to simplify the description and facilitate the understanding, an example is given of a configuration that controls the orientation and position of the menu display depending on the insertion direction and position of the hand. However, not only the menu but also the image on which the menu is superimposed (the image read out from the storage medium 102) may be rotated depending on the insertion direction of the hand.

Figure 10A:
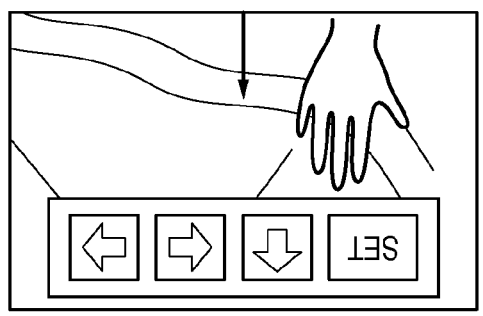
FIGS. 10A and 10B are diagrams showing an example of a case in which both the menu and the image are rotated and projected depending on the insertion direction of the hand in the image projection apparatus according to the first embodiment of the present invention.
Figure 10B:
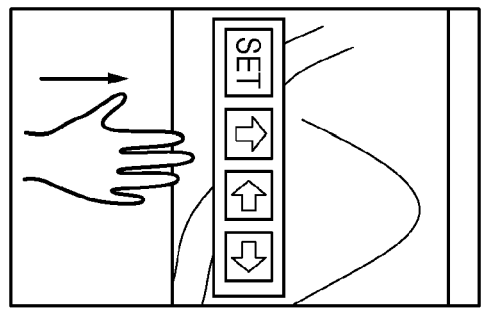

FIGS. 10A and 10B are diagrams showing examples of cases in which both the menu and the image are rotated and projected depending on the insertion direction of the hand. FIG. 10A shows an example of a case in which the insertion direction of the hand is the (3) shown in FIG. 5C. FIG. 10B shows an example of a case in which the insertion direction of the hand is the (4) shown in FIG. 5C. In both cases, the image and the menu are rotated and displayed so that the insertion direction of the hand is at the top.

Specifically, the projection image generating unit 101, based on rotation information from the system control unit 103, rotates the composite image resulting from the superimposition of the menu onto the image from the storage medium 102 (the image for display) so as to be able to achieve the display shown in FIG. 10A and FIG. 10B.

(Variation 2)

In the example described above, the insertion direction determination unit 107 determines the insertion direction of the hand from the representative fingertip position and the center of gravity of the hand region. However, determination of the insertion direction of a hand may be carried out based on any condition. Thus, for example, based on chronological change in the representative fingertip position, the moving direction of the representative fingertip position may be determined as the insertion direction.

Figure 11A:
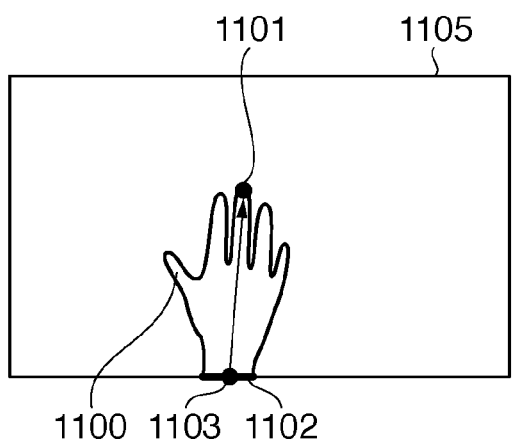
FIGS. 11A and 11B are diagrams illustrating an example of determining the insertion direction of the hand from a representative fingertip position and the relative positions of the hand region and a side of the projected image in the image projection apparatus according to the first embodiment of the present invention.
Figure 11B:
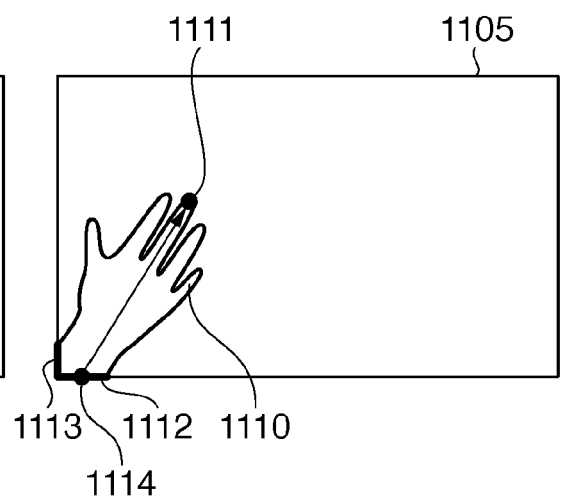

In addition, as shown in FIG. 11A and FIG. 11B, the insertion direction of the hand may be determined from the representative fingertip position and the relative positions of the hand region and the sides of the projected image. In FIG. 11A, a hand region 1100 and a representative fingertip position 1101 are detected by the hand region detection unit 105. In this case, from a center 1103 of a region 1102 where the hand region contacts the side of a projected image 1105, it can be determined that the insertion direction of the hand is toward the representative fingertip position 1101.

Moreover, in the example shown in FIG. 11B, the hand region contacts two sides of the projected image 1105 at contact portions 1112 and 1113. In a case such as this, from a center point 1114 of the longer of the contact portions 1112 and 1113 (contact portion 1112 in this example), it can be determined that the insertion direction of the hand is a direction toward the representative fingertip position 1111.

(Other Variations)

Although a description has been given of a configuration that decides the insertion direction of the hand as one of the predetermined insertion directions (1)-(4) shown in FIG. 5C, it is also possible to set in advance more insertion directions and to decide the insertion direction of the hand as one of five or more insertion directions. In this case, the rotation angles of the menu also become five or more, corresponding to the insertion directions.

In addition, it is not a requirement that the image sensing unit 104 be an infrared camera. Thus, for example, it is also possible to use a camera that senses images in the visible light region, in which case detection of the hand region can be accomplished by extracting a skin color pixel region from the sensed image and carrying out pattern matching to a shape pattern. In a case in which a camera that senses images in the visible light region is used as the image sensing unit 104, it is also possible to control so that the sensed images are recorded on the storage medium 102.

(Second Embodiment)

Next, a description is given of a second embodiment of the present invention.

The configuration of the image projection apparatus of the second embodiment maybe identical to the configuration of the first embodiment shown in FIG. 1, and therefore a description thereof is omitted. Moreover, the operation of the image projection apparatus of the second embodiment may be the same as that of the first embodiment except for the control operation performed by the menu display control unit 108, and therefore only a description of the operation of the menu display control unit 108 is given below.

Figure 12:
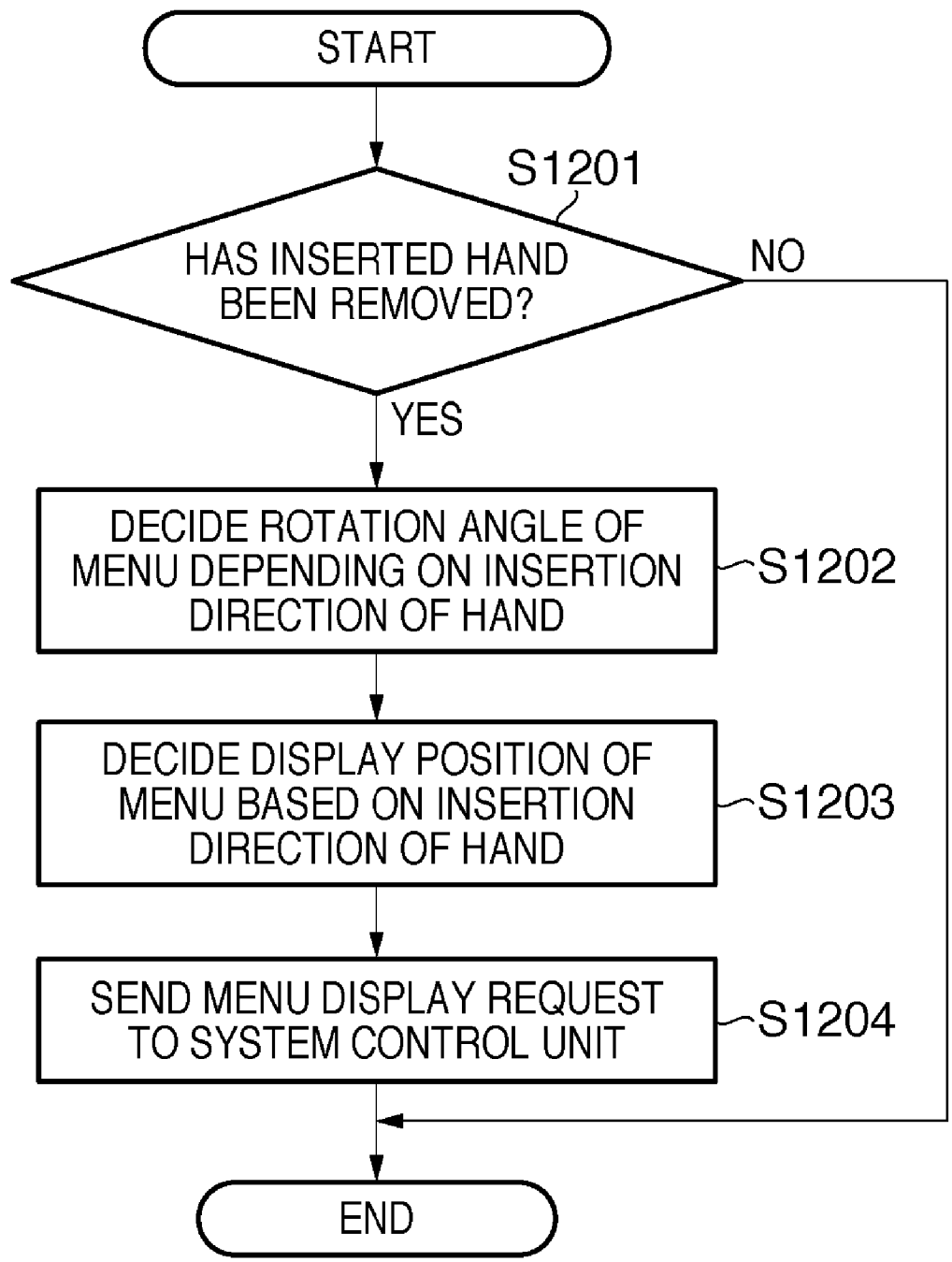
FIG. 12 is a flow chart illustrating operation of a menu display control unit of an image projection apparatus according to a second embodiment of the present invention.

A description is now given of the operation of the menu display control unit 108 of the present embodiment, based on the flow chart shown in FIG. 12.

In S1201, the menu display control unit 108, based on the position information of the hand output from the insertion direction determination unit 107, after the hand has existed for (has been inserted into) the projected image for at least a certain time period, determines whether the hand no longer exists on (has separated from) the projected image. Specifically, whether or not the hand has been inserted for a certain time period can be determined in the same way as in S601 in FIG. 6 in the first embodiment. In addition, from the fact that the hand region can no longer be detected it can be determined that the hand has separated from the projected image. Moreover, the menu display control unit 108, as the insertion direction of the hand, determines the insertion direction last detected prior to a point in time when it is determined that the hand has separated from the projected image as the ultimate insertion direction.

In S1202, the menu display control unit 108 decides the rotation angle of the menu depending on the insertion direction of the hand. This process is the same as the control carried out in S602 in FIG. 6.

In S1203, the menu display control unit 108 decides the display position of the menu depending on the insertion direction of the hand. In the present embodiment, because menu display is carried out in a state in which the hand is not on the projected image, that end portion of the projected image which is most likely to be nearest the hand is decided as the display position.

An example of a candidate display position for the menu in the image projection apparatus 10 of the present embodiment is shown in FIG. 13A. In FIG. 13A, menu candidate display positions 1301-1304 are disposed along the four edges of a projected image 1300, corresponding to each of the insertion directions (1)-(4) shown in FIG. 5C. For example, in a case in which the insertion direction of the hand is the (1) shown in FIG. 5C, the candidate display position 1301 is decided as the display position, and in a case in which the insertion direction of the hand is the (3) shown in FIG. 5C, the candidate display position 1303 is decided as the display position, respectively. FIG. 13B is a diagram showing a state in which menus are displayed for each of the candidate display positions 1301-1304.

In S1204, the menu display control unit 108 sends a request to the system control unit 103 to display the menu superimposed on the projected image, the same as in S604 in FIG. 6. In addition, the menu display control unit 108 also sends the decided menu display position and rotation angle information to the system control unit 103.

The system control unit 103, once it receives a menu display request from the menu display control unit 108, sends the menu display position and rotation angle information to the projection image generating unit 101. The projection image generating unit 101 rotates a pre-registered menu image based on the rotation angle information. Then, the projection image generating unit 101 superimposes on the image from the storage medium 102 the menu image at the position corresponding to the menu display position and generates an image for display, which it then outputs to the projection unit 100. In this manner, an image on which the menu is superimposed is projected from the projection unit 100. This process also is the same as in the first embodiment.

An example of menu display results is shown in FIGS. 14A-14C. FIG. 14A shows a state in which the user's hand is inserted into a projected image 1401. FIG. 14B shows a state in which the inserted user's hand is withdrawn from (separated from) the projected image. In a case in which the inserted user's hand is withdrawn from (separated from) the projected image as shown in FIG. 14B, the menu display control unit 108 holds the last detected insertion direction. Then, once the hand is withdrawn from the projected image, that is, when the hand region is no longer detected, a menu display request is sent from the menu display control unit 108 to the system control unit 103. Subsequently, as shown in FIG. 14C, the menu is superimposed on the projected image and displayed at a position corresponding to the insertion direction.

The user operation detection unit 106 detects a user instruction operation based on information relating to the hand region from the hand region detection unit 105, and outputs information on the detected instruction operation to the system control unit 103. Detection of the user instruction operation may be carried out in the same way as in the first embodiment. The user operation detection unit 106, once it detects a user pointing operation, outputs fingertip position information to the system control unit 103.

The system control unit 103, as in the first embodiment, with respect to the menu item displayed, determines if the user instruction operation is continuing for at least a predetermined time period. In a case in which it is determined that the fingertip position continues to exist over at least a predetermined time period within the region of the menu items, the system control unit 103 determines that the user is operating that menu item, and carries out operation according to the menu item.

In a case in which there is no instruction operation by the user for a certain time period, the system control unit 103 un-displays the menu and waits for the user's hand to again separate from the projected image.

Thus, as described above, the image projection apparatus of the present embodiment carries out menu display when a hand inserted into the projected image separates from the projected image. Moreover, the image projection apparatus of the present embodiment controls the rotation angle and the display position of the menu depending on the insertion direction of the hand immediately prior to separation of the hand from the projected image.

By controlling so that the menu is shown when a hand once inserted is withdrawn, it is possible to reduce degradation of legibility and malfunctions due to the menu being displayed on top of the user's hand. Moreover, because the menu is displayed at the edges of the projected image, the effect is that the projected image being displayed is not covered by the menu or the hand.

It should be noted that although in the present embodiment the insertion direction of the hand detected immediately prior to a point in time when it is determined that the hand has separated from the projected image is taken as the insertion direction of the hand, alternatively the insertion direction may be determined by other methods. For example, it is also possible to employ a method in which an insertion direction detected for the longest period of time (most number of times) within a certain time period within which the hand has been inserted can be decided as the ultimate insertion direction of the hand.

(Third Embodiment)

A description is now given of a third embodiment of the present invention.

The distinctive feature of the image projection apparatus of the present embodiment is controlling the display position and rotation angle of the menu depending on the projection direction.

Figure 15:
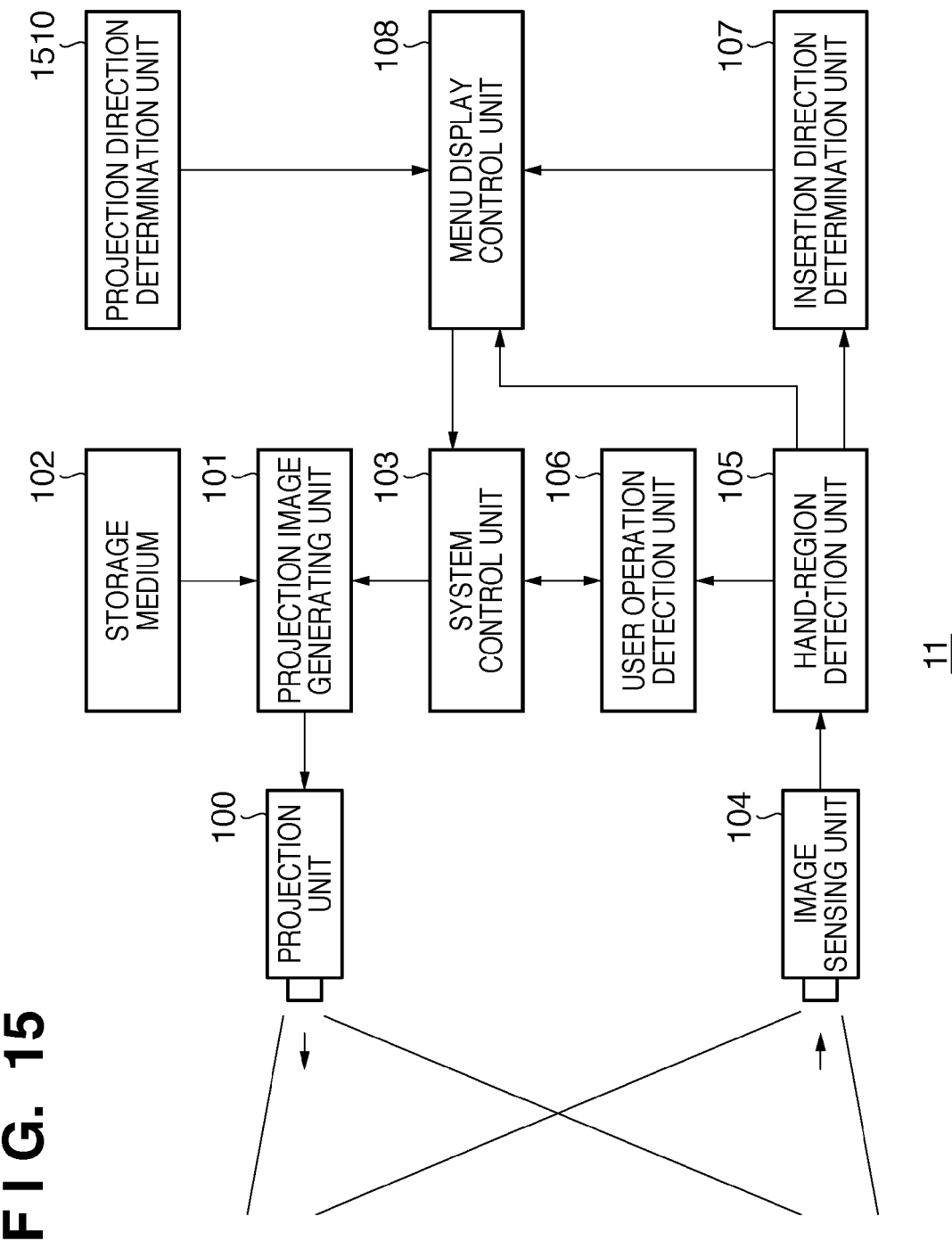
FIG. 15 is a block diagram showing one configuration example of an image projection apparatus according to a third embodiment of the present invention.

FIG. 15 is a block diagram showing one configuration example of an image projection apparatus according to a third embodiment of the present invention, in which parts that are the same as those in the first embodiment are given the same reference numerals as those in FIG. 1 and redundant descriptions thereof omitted. An image projection apparatus 11 of the present embodiment is configured such that the projection direction of a projection unit 100 can be selected from at least a horizontal direction and a vertical direction. The third embodiment differs from the first and second embodiments in that a projection direction determination unit 1510 for detecting the projection direction of the projection unit 100 is added. In addition, the operation of the menu display control unit 108 differs from that of the first and second embodiments.

The projection direction determination unit 1510 determines whether the projection direction of the projection unit 100 is horizontal or vertical. FIG. 16 is a diagram showing schematically projection directions capable of being handled by the projection unit 100.

In FIG. 16, a projection unit 100a and a projection unit 100b are schematically shown projecting onto a vertical surface such as a wall and a horizontal surface such as a desk, respectively.

The projection direction determination unit 1510 comprises a tilt sensor such as a gyro sensor that senses a tilt of the projection unit 100. Then, based on the tilt of the projection unit 100 output from the tilt sensor, the projection direction determination unit 1510 determines the projection direction of the projection unit 100 (whether projecting onto a vertical surface or projecting onto a horizontal surface). Specifically, in a case in which the projection direction determination unit 1510 determines that an optical axis of a projection optical system of the projection units is tilted below a threshold value, the projection direction determination unit 1510 determines that the projection unit is projecting onto a horizontal surface, and in the case of all other tilts determines that the projection unit is projecting onto a vertical surface. The projection direction determination unit 1510 outputs projection direction determination results to the menu display control unit 108.

In addition, as in the first embodiment, hand position and hand insertion direction information is output to the menu display control unit 108 from the insertion direction determination unit 107.

Figure 17:
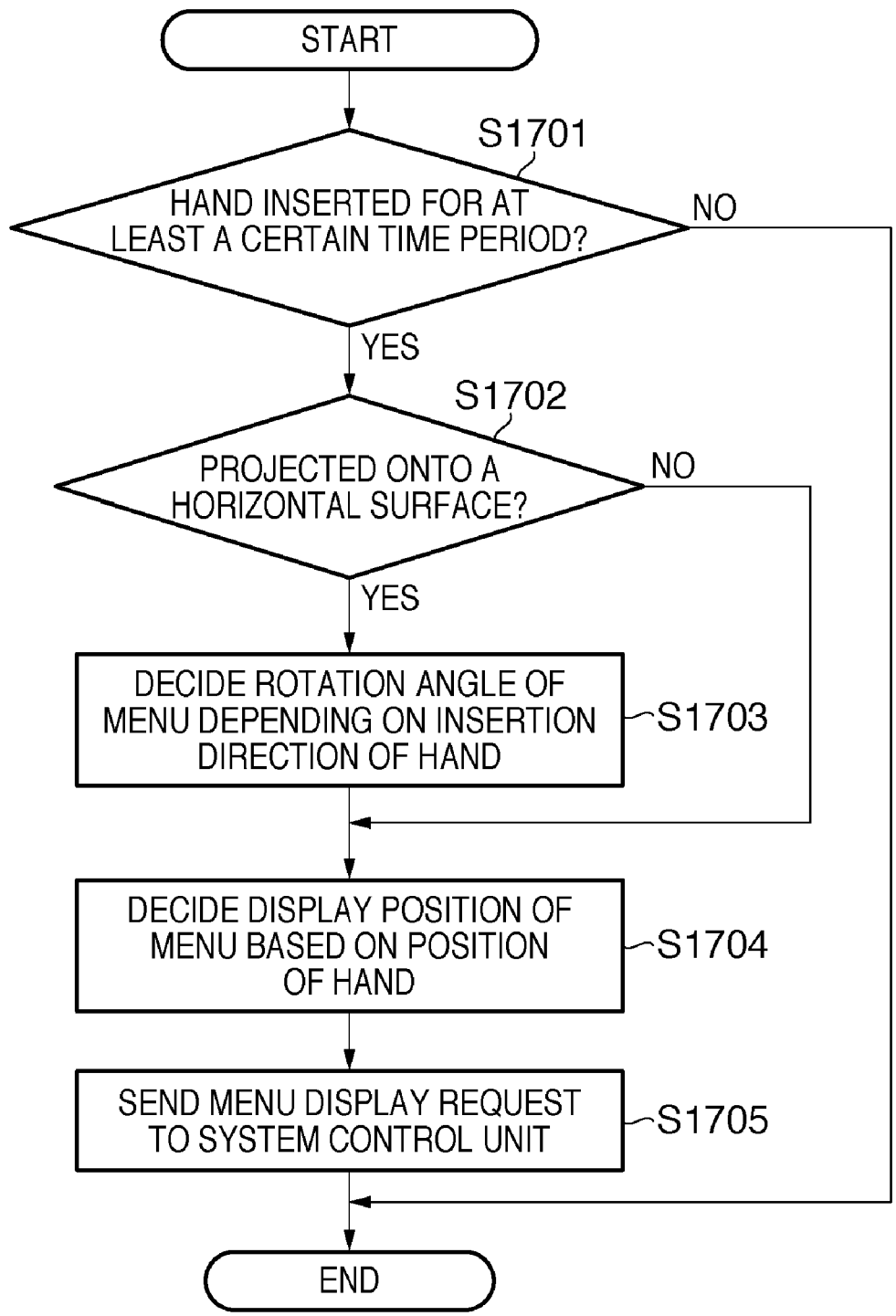
FIG. 17 is a flow chart illustrating operation of a menu display control unit of the image projection apparatus according to the third embodiment of the present invention.

FIG. 17 is a flow chart illustrating an example of operation of the menu display control unit 108 of the present embodiment.

In S1701, the menu display control unit 108 determines whether or not a hand has been inserted for least a certain time period into the projected image. In a case in which it is determined that the hand has been inserted for least a certain time period, the menu display control unit 108 advances processing to S1702. In a case in which a hand has not been inserted for at least a certain time period, the menu display control unit 108 terminates processing.

In S1702, the menu display control unit 108, based on the projection direction information output from the projection direction determination unit 1510, determines if the projection unit 100 is projecting onto a horizontal surface. In a case in which the projection unit 100 is projecting onto a horizontal surface, the menu display control unit 108 advances processing to step S1703 to rotate the display direction of the menu depending on the insertion direction of the hand. On the other hand, in a case in which the projection unit 100 is not projecting onto a horizontal surface, in other words in a case in which the projection unit 100 is projecting onto a vertical surface, then the menu display control unit 108, because it does not carry out control of the display direction of the menu, advances processing to S1704.

Figure 18:
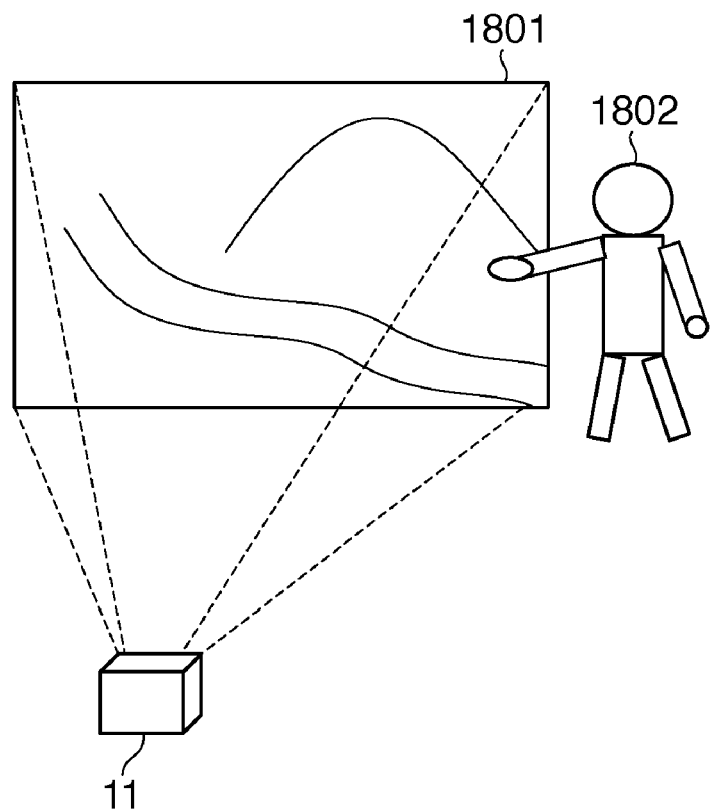
FIG. 18 is a diagram showing schematically the image projection apparatus according to the third embodiment of the present invention projecting images onto a vertical surface.

A description is now given of the reason why the menu display control unit 108 does not control the display direction of the menu when it is determined that the projection unit 100 is projecting onto a vertical surface. FIG. 18 is a diagram showing schematically the image projection apparatus 11 (the projection unit 100) projecting onto a vertical surface.

When projecting onto a vertical surface, an orientation of a projected image 1801 that a user 1802 sees is always constant. Consequently, in a case in which a hand is inserted from the left or the right of the projected image as shown in FIG. 18, if the display direction of the menu is rotated as described in the first embodiment the legibility of the menu to the user would conversely deteriorate. Accordingly, in the present embodiment, in a case in which is determined that projection is onto a vertical surface, the display direction of the menu is not controlled. In other words, regardless of the moving direction of the predetermined object, a constant display direction is decided.

In S1703, the menu display control unit 108 decides the rotation angle of the menu depending on the position and insertion direction of the hand detected from the insertion direction determination unit 107. At this point, the same process is carried out as in 5602 in FIG. 6 described in the first embodiment.

In S1704, the menu display control unit 108 decides the display position of the menu depending on the position of the hand. The display position of the menu is decided by the same process as in S603 in FIG. 6 described in the first embodiment, that is, as in the examples shown in FIGS. 8A-8D.

Figure 19:
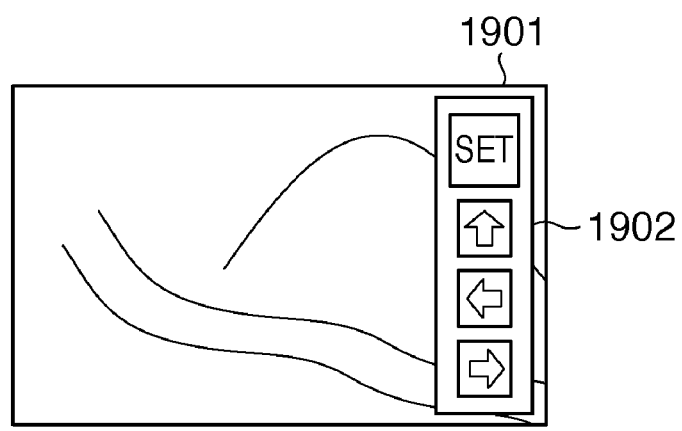
FIG. 19 is a diagram showing an example of a menu display in the case in which the image projection apparatus according to the third embodiment of the present invention is projecting onto a vertical surface.

An example of menu display in a case of projecting onto a vertical surface is shown in FIG. 19. FIG. 19 shows a state in which a hand is inserted into a projected image 1901 from the right side. A menu 1902 is superimposed on and displayed along the right edge of the projected image 1901, but because the image is being projected onto a vertical surface, unlike in the first embodiment (FIG. 7B) the menu 1902 is not rotated. In addition, the items of the menu 1902 are disposed in vertical alignment.

In S1705, the menu display control unit 108 sends a request to the system control unit 103 to overlay the menu on the projection image and display. The process here is the same as the control carried out in S603 in FIG. 6.

Returning to FIG. 15, the system control unit 103, having received a menu display request from the menu display control unit 108, causes the projection image generating unit 101 to superimpose and display the menu. The system control unit 103 carries out processing according to the user operation that the user operation detection unit 106 detects. These processes are the same as the processes of the first embodiment, and therefore detailed descriptions thereof are omitted.

Thus, as described above, according to the present embodiment, there is provided a projection direction determination unit that determines a projection direction, and which switches the menu display method between a case of projecting onto a horizontal surface and a case of projecting onto a vertical surface, thereby enabling legibility and usability of the projected menu to be improved.

In the present embodiment a description is given of an example of a case in which the menu is displayed when the hand is inserted as with the first embodiment. However, as described with reference to the second embodiment, control so as to display the menu may be carried out in a case in which a hand once inserted into the projected image is withdrawn from the projected image.

In addition, although in the present embodiment a description is given of a case in which the projection direction determination unit 1510 determines the projection direction based on tilt information from the gyro sensor, detection of the projection direction is not limited thereto. For example, a setting unit that accepts settings from the user to project onto a horizontal surface or vertical surface may be provided, and a determination may be made as to which surface to project onto based on the set information.

(Other Embodiments)

In all the embodiments described above, descriptions are given of examples in which, as the predetermined object used to operate the menu, a hand is set as the predetermined object and control of the display of the menu is carried out depending on the position and insertion direction of a hand region detected in the sensed image. However, for example, even in a case in which the user does not directly operate the menu by hand, the present invention is applicable. For example, in a case in which the user uses a pen or a pointer or the like to operate the menu, it is possible to detect the pen or the pointer used in place of the hand as a particular object. In this manner, the present invention is such that, essentially, provided that the predetermined object used to operate the menu and its position can be detected, the shape of the predetermined object and the method of detecting its position are irrelevant.

Therefore, in the detection of the predetermined object used to operate the menu it is not necessary to use a sensed object that has sensed a range that includes the projected image, and thus any other method can be used. For example, a position sensor maybe mounted on the user's hand and the position of hand and its moving direction may be determined based on the position that the position sensor detects and any changes therein. In this case, the position sensor is used instead of the image sensing unit, and a position detection unit is provided that detects position from the output from the image sensor instead of the hand region detection unit 105. Moreover, the insertion direction determination unit 107 may determine the insertion direction depending on changes over time in the detected position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-229455, filed on Sep. 4, 2007, which is hereby incorporated by reference herein in its entirety.

The invention claimed is:

1. An image projection apparatus comprising:
a projection unit adapted to project a projection image and a GUI image onto a projection surface;
a position detection unit adapted to detect a position of a predetermined object on the projection surface;
an inserted direction determination unit adapted to determine an inserted direction of the predetermined object;
a deciding unit adapted to decide at least one of a display position and a display direction of the GUI image based on detection results obtained by the position detection unit and determination results obtained by the inserted direction determination unit;
a control unit adapted to control a projection, operation of the GUI image performed by the projection unit based on at least one of the display position and the display direction decided by the deciding unit; and
a projection direction determination unit adapted to determine a projection direction of the projection unit,
wherein, in a case in which it is determined by the projection direction determination unit that the projection unit is projecting onto a vertical surface, the deciding unit decides a constant display direction regardless of the inserted direction of the predetermined object.

2. The image projection apparatus according to claim 1, wherein the position detection unit detects the predetermined object using a sensed image that has sensed the projection surface including an image projected by the projection unit.

3. The image projection apparatus according to claim 1, wherein the deciding unit decides the display direction of the GUI image so that the inserted direction of the predetermined object and the top of the GUI image match.

4. The image projection apparatus according to claim 1, wherein the deciding unit decides a position in a vicinity of the predetermined object and separated in the inserted direction of the predetermined object as the display position.

5. The image projection apparatus according to claim 1, wherein the deciding unit carries out deciding in a case in which the predetermined object exists for at least a predetermined time period on an image projected on the projection surface.

6. The image projection apparatus according to claim 1, wherein the inserted direction determination unit determines the inserted direction of the predetermined object based on detection results obtained by the position detection unit.

7. The image projection apparatus according to claim 6, wherein the inserted direction determination unit determines the inserted direction of the predetermined object by determining a moving direction of the predetermined object based on detection results obtained by the position detection unit.

8. A control method for an image projection apparatus, comprising:
a projection step of projecting a projection image onto a projection surface with a projection unit;
a position detection step of detecting information relating to a position of a predetermined object on the projection surface;
an inserted direction determination step of determining an inserted direction of the predetermined object;
a deciding step of deciding at least one of a display position and a display direction of a GUI image projected using the projection unit based on detection results obtained in the position detection step and determination results obtained in the inserted direction determination step;
a control step of controlling the projection unit based on at least one of the display position and the display direction decided in the deciding step and at the same time projecting the GUI image onto the image; and
a projection direction determination step of determining a projection direction of the projection unit,
wherein, in a case in which it is determined in the projection direction determination step that the projection unit is projecting onto a vertical surface, the deciding step decides a constant display direction regardless of the inserted direction of the predetermined object.

* * * * *